United States Patent [19]

Sykes

[11] Patent Number: 4,678,617

[45] Date of Patent: Jul. 7, 1987

[54] METHOD FOR CONVERTING AN EXPENDED THERMOPLASTIC ARTICLE INTO A USEFUL ARTICLE

[75] Inventor: Donald J. Sykes, Upper Saddle River, N.J.

[73] Assignee: Marpac Industries, Inc., Waldwick, N.J.

[21] Appl. No.: 749,818

[22] Filed: Jun. 28, 1985

[51] Int. Cl.⁴ .................. H05B 6/00; B29B 17/00; B29C 49/00

[52] U.S. Cl. ............................ 264/25; 29/401.1; 52/DIG. 9; 264/37; 264/512; 264/535; 264/572; 264/DIG. 69; 425/DIG. 41; 425/DIG. 46

[58] Field of Search ............... 264/25, 37, 512, 523, 264/530, 535, 572–574, DIG. 69; 425/DIG. 41, DIG. 46; 52/DIG. 9; 29/401.1

[56] References Cited

U.S. PATENT DOCUMENTS

| | | | |
|---|---|---|---|
| 1,746,869 | 2/1930 | Rosenthal | 29/401.1 |
| 3,224,239 | 12/1965 | Hansson | 264/523 X |
| 3,843,005 | 10/1974 | Uhlig | 264/530 X |
| 3,892,829 | 7/1975 | Uhlig | 264/530 |

*Primary Examiner*—Jan H. Silbaugh
*Assistant Examiner*—Neil Michael McCarthy
*Attorney, Agent, or Firm*—Samuelson & Jacob

[57] ABSTRACT

Disclosed herein are a method and apparatus for converting an expended, hollow article of thermoplastic material, the article having opposite end walls, an opening in one of the end walls and an annular wall extending between the opposite end walls establishing an original configuration, into a new article of a new configuration. Specifically, the expended article is a two-liter soda bottle and the new article is a building block. The method comprises the steps of heating the expended article to a temperature above the softening temperature of the thermoplastic material, applying forming forces inwardly against the article while the temperature of the article is above the softening temperature so as to change the configuration from the original configuration to the new configuration, and introducing air under pressure into the article through the opening to create and maintain an elevated air pressure within the article while the forming forces are being applied, to urge the walls of the article outwardly against the forming forces. The method includes the further step of cooling the article to a temperature below the softening temperature after the new configuration is achieved and before cessation of the application of forming forces. The apparatus includes two mold members defining a mold cavity of the new configuration and movable between an open position and a closed position. One of the mold members has a passage for alternately carrying a heating medium for heating the mold cavity and a cooling medium for cooling the cavity.

10 Claims, 6 Drawing Figures

METHOD FOR CONVERTING AN EXPENDED THERMOPLASTIC ARTICLE INTO A USEFUL ARTICLE

This invention relates to the utilization of used, heretofore wasted articles, such as thermoplastic soda bottles, which are non-biodegradable, by converting such items into new, useful articles, such as building blocks. More particularly, the invention relates to method and apparatus for converting a blow-molded thermoplastic soda bottle into a building block.

Millions of soda bottles are blow-molded of thermoplastic material, typically polyethylene terpolymer ("P.E.T."). These bottles each are used once and then discarded as waste. The practice has created a problem which becomes even more serious by virtue of the fact that the waste bottles are non-biodegradable in any dump or landfill. The present invention enables the conversion of such waste bottles into articles of renewed utility and thus enables an economically sound solution to the problem of waste disposal while, at the same time, providing a ready source of valued new articles. For example, even in under-developed areas where building materials are in short supply, beverage bottles are plentiful, so it would be desirable to have available method and apparatus for converting such beverage bottles, when expended, into building blocks.

The prior art discloses various attempts to utilize scrap or waste material. Dittmer, U.S. Pat. No. 3,589,090, issued June 29, 1971, for example, discloses reshaping metal cans into screens, and Diederick, U.S. Pat. No. 3,733,675, issued May 22, 1973, discloses compressing junk cars to produce construction blocks.

The prior art also recognizes the problem created by used bottles. In this connection, Barrett, U.S. Pat. No. 4,057,946, issued Nov. 15, 1977, proposes that glass bottles be manufactured of such shape as to be capable of modular assembly with each other. Likewise, U.K. Pat. No. 869,392, published May 31, 1961, proposes a beverage bottle which also can be used as a building brick after emptying. Neither of these patents relates to reshaping an expended bottle to create a useful article. As far as is known, the prior art has not disclosed the concept of reshaping a thermoplastic bottle, which heretofore has been waste, into a useful article such as a building block.

Important objects of the invention are to provide an economically viable method and apparatus for converting a previously used, otherwise waste, bottle or other expended article of an original configuration into an economically valuable building block or other new article of a new configuration.

Other objects and advantages will become apparent.

The method and apparatus of the present invention enable the conversion of an expended, hollow article of thermoplastic material, the article having opposite end walls, an opening in one of the opposite end walls and an annular wall extending between the opposite end walls establishing an original configuration, into a new article having a new configuration. The method and apparatus are described hereinafter specifically, but without limitation, as applied to the conversion of an expended two-liter soda bottle of P.E.T. into a building block.

The method comprises the steps of heating the expended article, preferably a beverage bottle, to a temperature above the softening temperature of the thermoplastic material, applying external forming forces inwardly against the bottle while the temperature thereof is above the softening temperature to change the configuration from the original configuration to the new configuration, and introducing a fluid, such as air, under pressure into the article through an opening therein to create and maintain an elevated pressure within the article while the forming forces are being applied, so as to urge the walls outwardly against the forming forces. The method includes the further step of cooling the article to a temperature below the softening temperature after the new configuration is achieved and before cessation of the application of the forming forces.

The apparatus includes upper and lower mold members defining a mold cavity of the new configuration and movable relative to one another between an open position and a closed position. At least one of the mold members has a passage for alternately carrying a heating medium for heating the mold cavity and a cooling medium for cooling the cavity. The lower mold member has a conduit in open communication with the portion of the mold cavity provided by the lower mold member and the outside of the lower mold member. The conduit is positioned to register with the opening in the expended article and the apparatus further includes means for introducing fluid under pressure into the article through the conduit and the opening.

It is apparent that the invention provides a method and apparatus enabling the conversion of an economic liability into an economic asset.

The invention will be understood more fully, while still further objects and advantages will become apparent in the following detailed description of embodiments of the invention illustrated in the accompanying drawing, in which.

Figure 1:
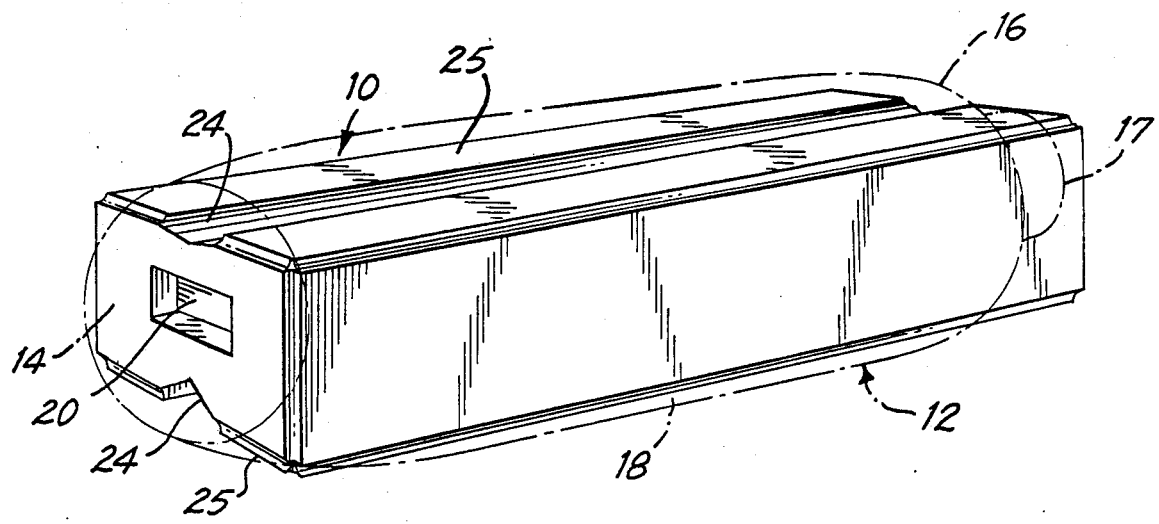
FIG. 1 is a perspective view of a building block produced from a beverage bottle, depicted in phantom, by method and apparatus of the invention.
Figure 2:
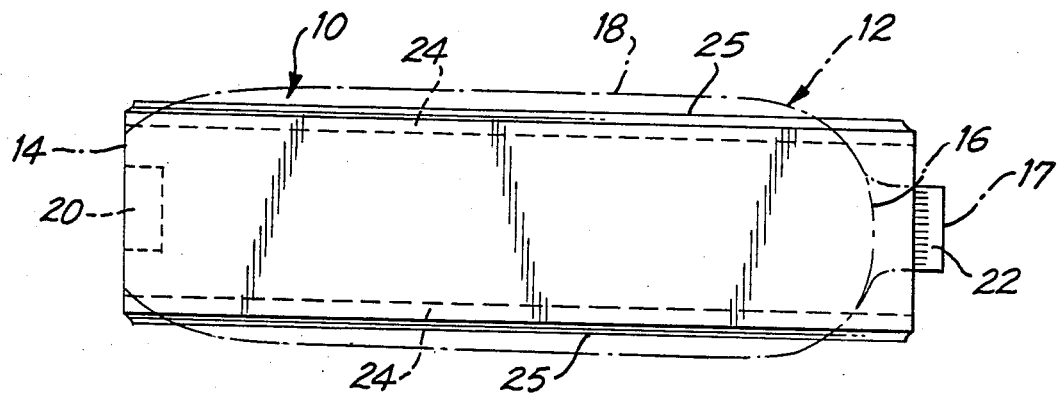
FIG. 2 is a side view of the building block and beverage bottle of FIG. 1.
Figure 3:
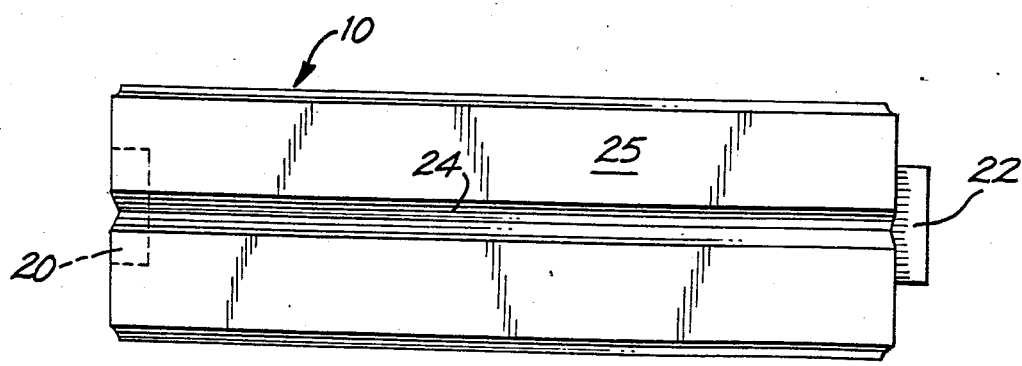
FIG. 3 is a top view of the building block of FIG. 1.
Figure 5:
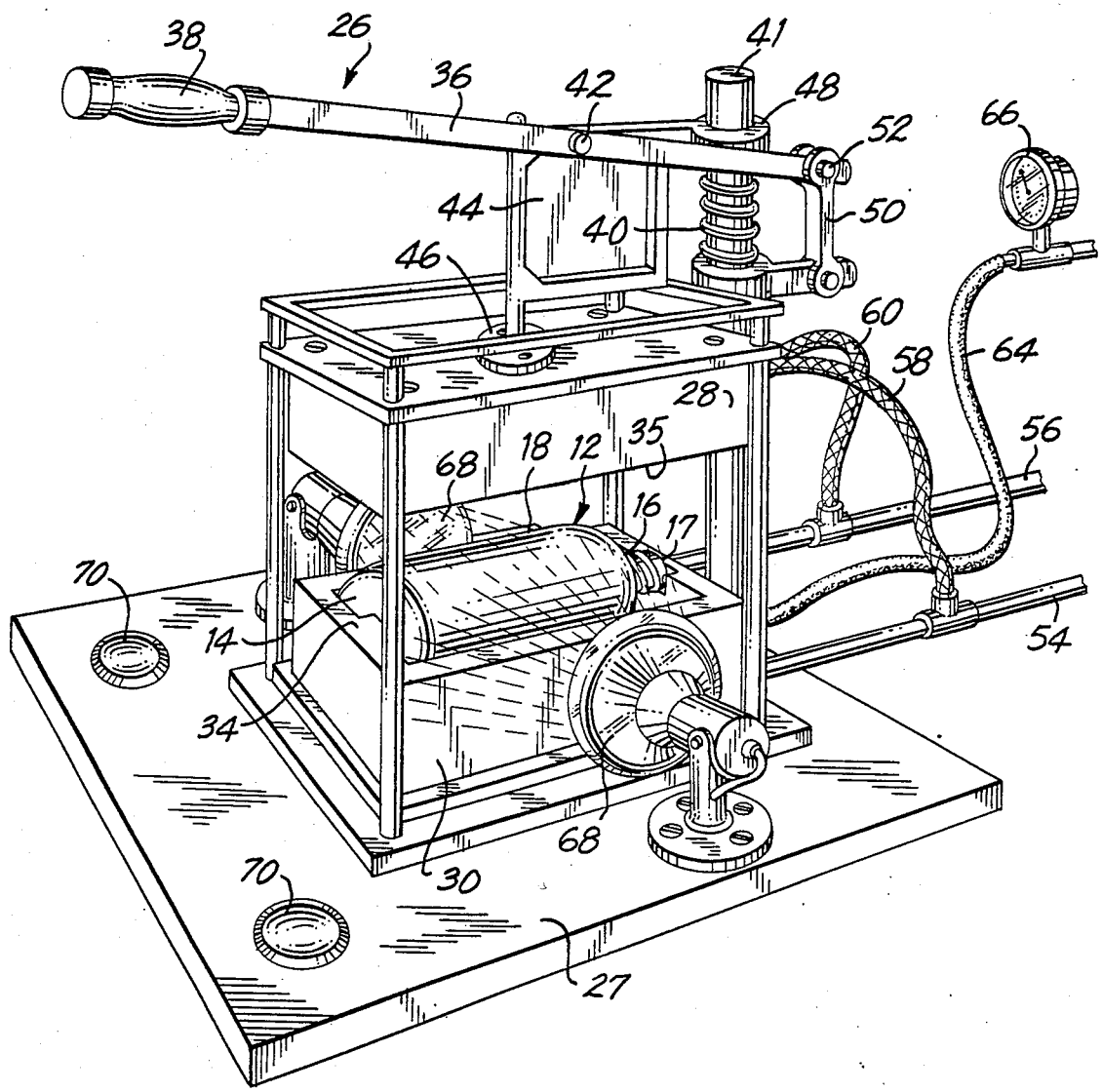
FIG. 5 is a view similar to FIG. 4, but showing the beverage bottle in place in the mold cavity portion of the lower mold member.

Referring now to the drawing, FIGS. 1, 2, and 3 show a building block 10 produced by method and apparatus of the invention by conversion from an expended two-liter soda bottle 12, which is shown in phantom in FIGS. 1 and 2 and in full lines in FIG. 5. Bottle 12, which is of thermoplastic material, such as P.E.T., has a closed end wall 14, an opposite end wall 16 having an opening 17 therein, and a thin annular wall 18 extending between the opposite end walls 14 and 16 and defining the longitudinal axis of bottle 12. Bottle 12 has an original configuration which is substantially circular in sections perpendicular to the longitudinal axis of bottle 12. The thermoplastic material has a predetermined softening temperature.

Building block 10 is largely hollow and is generally in the shape of a parallelepipedon having an indentation 20 at one end and a protrusion 22 at the other end thereof. Indentation 20 and protrusion 22 are dimensioned and configured so that protrusion 22 of one block 10 can fit within indentation 20 of another block 10. Protrusion 22 is at the end of block 10 corresponding to end wall 16 of bottle 12. Block 10 is provided with longitudinal grooves 24 along upper and lower faces 25 to enable the keying of mortar placed between juxtaposed blocks when in use. It is evident that bottle 12 has an original configuration and building block 10 has a new configuration.

Figure 4:
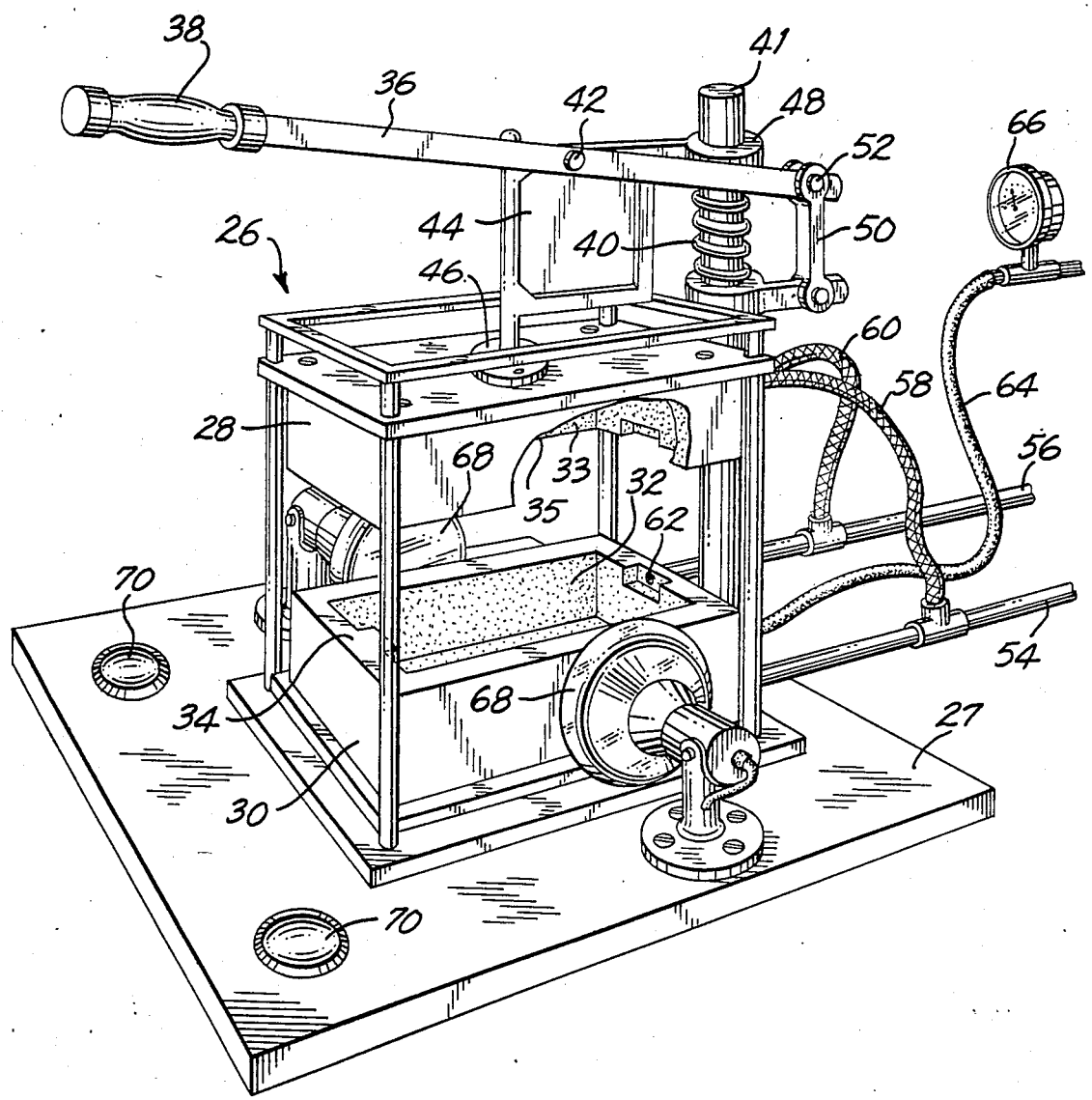
FIG. 4 is a somewhat schematic perspective view of apparatus embodying the invention, including upper and lower mold members in a fully-open position.
Figure 6:
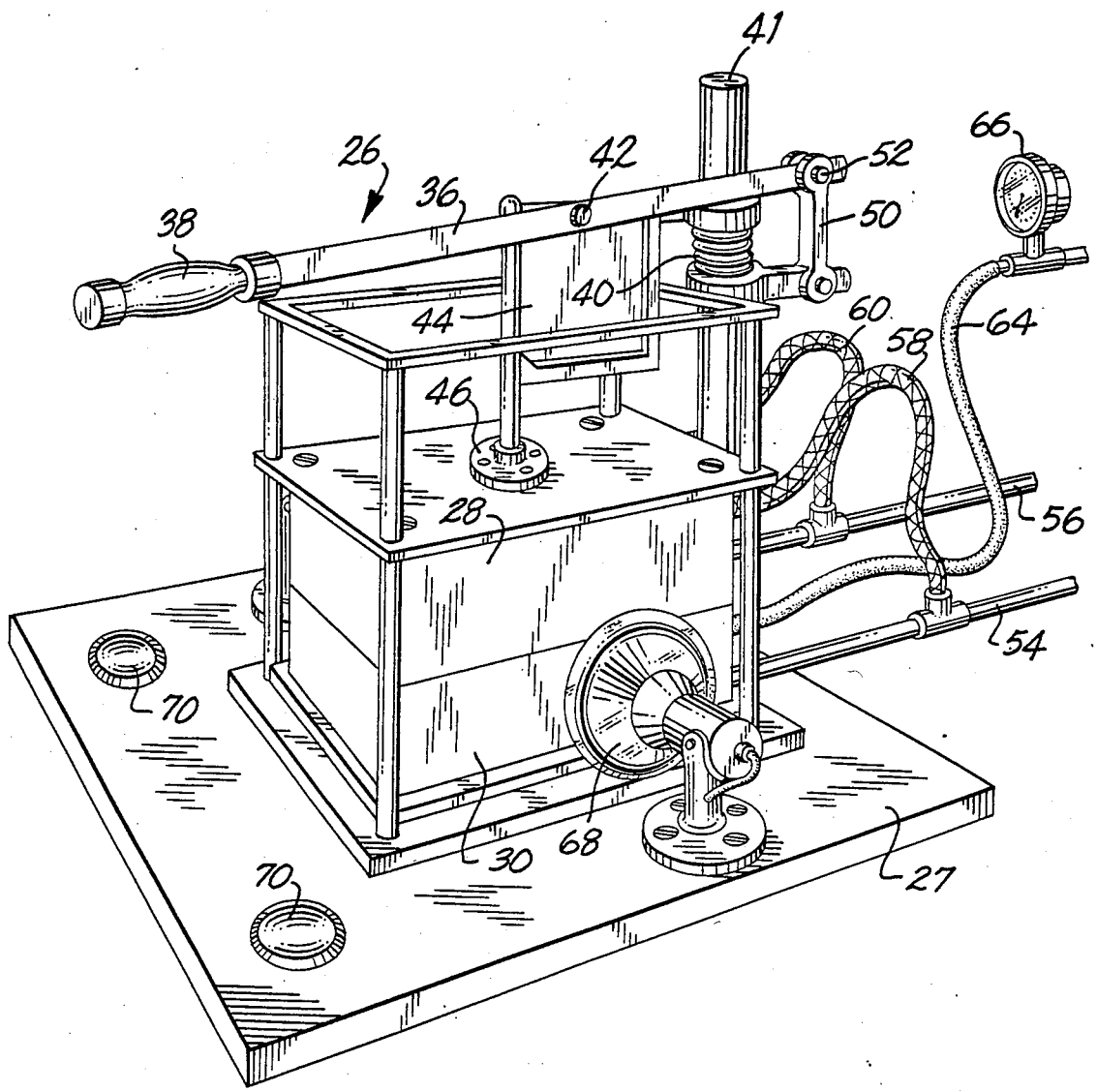
FIG. 6 is a view similar to FIG. 5 but showing the mold members in a fully-closed position.

FIGS. 4, 5, and 6 show apparatus, indicated generally at 26, embodying the invention, for carrying out the method of the invention. Apparatus 26 is mounted on a base 27 and includes first and second mold members 28 and 30, respectively. Mold member 28 is a movable upper mold member and mold member 30 is a stationary lower mold member. Mold members 28 and 30 include confronting complementary portions which cooperate to define a mold cavity of the new configuration. The portion of the mold cavity provided by lower mold member 30 is indicated at 32 in FIG. 4, and the portion of the mold cavity provided by the upper mold member 28 is indicated at 33.

Mold members 28 and 30 are relatively movable between an open position, as illustrated in FIGS. 4 and 5, and a closed position, as shown in FIG. 6, in which confronting faces of mold members 28 and 30 abut each other, the face of mold member 30 being indicated at 34 and the face of mold member 28 being indicated at 35 in FIGS. 4 and 5. To that end, upper mold member 28 is mounted for movement toward and away from lower mold member 30 by means of a lever 36 having at one end thereof a handle 38 which is moved downwardly to move upper mold member 28 downwardly toward mold member 30 against the resistance of a helical spring 40 near the other end of lever 36, spring 40 being mounted on a vertical post 41 so as to surround the post. Lever 36 is operatively connected at a location between the ends thereof at 42 to a plunger member 44 which is fastened to mold member 28 at 46. Plunger member 44 has a sleeve portion 48 which slides along post 41 and bears against the upper end of spring 40, to apply a compression force to spring 40 when handle 38 is moved downwardly. A linkage 50 anchors the end of lever 36 remote from handle 38 and provides a fulcrum 52.

At least one of the mold members 28 and 30 has heating means, shown in the form of passage means for carrying a heating medium such as water or oil, of selected temperature for heating the mold cavity. In the illustrated embodiment, both of the mold members 28 and 30 are provided with such passage means. As shown, a fluid delivery line 54 delivers heating fluid to mold member 30, and a fluid return line 56 carries the fluid away from mold member 30. A flexible hose 58 taps into line 54 and delivers heating fluid to mold member 28, and a flexible hose 60 is tapped into line 56 and carries the fluid away from mold member 28. Fluid delivery line 54 and hose 58 are alternately used for carrying a temperature controlled cooling fluid, such as water or oil, for cooling the mold cavity, in which case fluid return line 56 and hose 60 carry the cooling fluid away from the mold cavity.

Mold member 30 has a conduit 62 (see FIG. 4) including an inner end in open communication with mold cavity portion 32 and an outer end in open communication with the outside of mold member 30. Conduit 62 is positioned to register with opening 17 in end wall 16 of bottle 12. An air line 64 having an air pressure gauge 66 is coupled with the outer end of conduit 62, air line 64 providing apparatus 26 with means for introducing air under pressure into bottle 12 through conduit 62. Apparatus 26 further has infrared heating means in the form of two confronting infrared heaters 68 mounted on base 27 on opposite sides of member 30. Infrared heaters 68 are turned on and off selectively by palm control buttons 70.

The use of apparatus 26 to perform the method of the invention will now be described.

With the mold members 28 and 30 in the fully-open position (as seen in FIGS. 4 and 5), bottle 12 is placed in mold cavity portion 32, with opening 17 of end wall 16 of bottle 12 in registry with conduit 62, and infrared heaters 68 are turned on by depressing palm control buttons 70, to perform a pre-heating operation. The pre-heating operation decreases the amount of heat which must be supplied later. Infrared heaters 68 then are turned off and air under pressure is introduced into bottle 12 by passing through air line 64 and conduit 62 into opening 17 in end wall 16 of bottle 12, thus to create and maintain an elevated pressure within bottle 12 while forming forces are applied externally, to convert bottle 12 into building block 10, the elevated internal pressure serving to urge walls 14, 16 and 18 outwardly against the forming forces to be applied as follows.

Next, handle 38 is lowered to move mold member 28 to a partially-closed position and heating fluid of a selected, controlled elevated temperature is circulated through mold members 28 and 30 through line 54 and hose 58 and out through lines 56 and hose 60, to raise the temperature of bottle 12 to a temperature above the softening temperature of the material of bottle 12.

Handle 38 then is lowered further to move mold member 28 to its fully-closed position with respect to mold member 30 and to close the mold cavity fully, thus applying external forming forces to bottle 12 to change its configuration from the original configuration to the new configuration of building block 10, all with the temperature of bottle 12/building block 10 above the softening temperature.

At this point, the supply of fluid is changed so that a cooling fluid of a selected controlled lower temperature is circulated through mold members 28 and 30, which cools building block 10 to a temperature below the softening temperature while mold members 28 and 30 remain in the fully-closed position, thus continuing to apply the forming forces. When building block 10 has been cooled to a temperature below the softening temperature, lever 38 is released and spring 40 raises lever 38 to move mold member 28 to the fully-open position, and the supply of air through line 64 is discontinued. Building block 10 then is removed from mold member 30.

A reflective coating, as of aluminum, then may be applied to either the external surface or the internal surface of building block 10. Decorative coatings also may be utilized in conjunction with the reflective coating.

It is apparent that the invention, in both its method and apparatus aspects, is well adapted to achieving the stated objects and advantages and others.

It is to be understood that the above detailed description of embodiments of the invention are provided by way of example only. Various details of procedure, design and construction may be modified without departing from the true spirit and scope of the invention, as set forth in the appended claims.

The embodiments of the invention in which an exclusive property or privilege is claimed are defined as follows:

1. Converting an expended, hollow article of thermoplastic material, in the form of an expended container, the article having opposite end walls establishing an original configuration, into a new article, in the form of a building block, having a new configuration, by utilizing the steps of heating the expended article to a temperature above the softening temperature of said material, applying external forming forces inwardly against said article while the temperature of the article remains above said softening temperature, and maintaining an elevated pressure within said article while said forming forces are being applied, to urge said walls outwardly against said forming forces, for effecting conversion from said original configuration to said new configuration.

2. The invention of claim 1 wherein said step of maintaining an elevated pressure within said article includes introducing a fluid under pressure into said article through said opening.

3. The invention of claim 2 including the further step of cooling said article to a temperature below said softening temperature after said new configuration is achieved and before cessation of the application of said forming forces.

4. The invention of claim 3 wherein said step of applying external forming forces to said article is accomplished with the aid of a pair of mold members defining a cavity configured to apply said forming forces, said step of heating said article to a temperature above said softening temperature is accomplished by passing a heating medium of selected temperature adjacent to said cavity, and said cooling step is accomplished by passing a cooling medium of selected temperature adjacent to said cavity.

5. The invention of claim 1 including the further step of pre-heating the expended article prior to said step of heating said expended article to a temperature above the softening temperature of said material.

6. The invention of claim 5 wherein said further step of pre-heating the expended article is accomplished by infrared heat.

7. The invention claim 1 wherein the expended article is a beverage bottle.

8. The invention of claim 7 wherein the expended article is a two-liter soda bottle.

9. The invention of claim 8 wherein the new article has external and internal surfaces and including the further step of applying a reflective coating material to at least one of the external and internal surfaces of said new article.

10. The invention of claim 9 wherein said reflective coating material is aluminum.

* * * * *